(12) United States Patent
Kuenzer

(10) Patent No.: US 6,901,967 B1
(45) Date of Patent: Jun. 7, 2005

(54) NATURAL GAS PIPE REPAIR FITTING AND METHOD

(76) Inventor: Rodney C. Kuenzer, 12613 Yates Rd., Copemish, MI (US) 49625

( * ) Notice: Subject to any disclaimer, the term of this patent is extended or adjusted under 35 U.S.C. 154(b) by 0 days.

(21) Appl. No.: 10/841,361

(22) Filed: May 7, 2004

(51) Int. Cl.[7] .............................................. F16L 55/16
(52) U.S. Cl. ........................... 138/99; 138/97; 138/92; 138/156
(58) Field of Search ................................ 138/99, 98, 97, 138/92, 157, 162

(56) References Cited

U.S. PATENT DOCUMENTS

| | | | | |
|---|---|---|---|---|
| 1,737,181 A | * | 11/1929 | Woodward | 137/15.08 |
| 2,286,751 A | * | 6/1942 | Merrill | 138/99 |
| 2,999,515 A | * | 9/1961 | Watson | 138/99 |
| 3,258,822 A | * | 7/1966 | Schlesch et al. | 24/284 |
| 3,563,276 A | * | 2/1971 | High et al. | 138/99 |
| 3,861,422 A | * | 1/1975 | Christie | 138/99 |
| 3,944,260 A | | 3/1976 | Petroczky | 138/99 X |
| 4,015,634 A | * | 4/1977 | Christie | 138/99 |
| 4,357,961 A | * | 11/1982 | Chick | 138/97 |
| 4,673,122 A | * | 6/1987 | Dubey | 228/119 |
| 4,756,338 A | * | 7/1988 | Guyatt et al. | 138/99 |
| 4,915,424 A | | 4/1990 | Sarno et al. | 285/133.21 |
| 4,949,744 A | * | 8/1990 | Heed et al. | 137/15.15 |
| 5,022,685 A | | 6/1991 | Stiskin et al. | 138/166 X |
| 5,368,337 A | | 11/1994 | Torres | 285/114 |
| D362,916 S | | 10/1995 | Cetrulo | D25/66 |
| 5,853,030 A | * | 12/1998 | Walding | 138/99 |
| 6,217,688 B1 | | 4/2001 | Landers | 138/99 X |
| 6,237,640 B1 | * | 5/2001 | Vanderlee | 138/99 |
| 6,305,719 B1 | | 10/2001 | Smith, Jr. et al. | 138/99 X |

* cited by examiner

Primary Examiner—Patrick Brinson

(57) ABSTRACT

Natural gas pipe repair fittings and methods for using same allow safely welding a pipe repair fitting over a leaking natural gas service line "T" fitting. A bottom half and a top half are welded together to form a hollow cylinder having hemispherical ends with semicircular pipe notches in them. A hollow vertical pipe has one end welded over a pipe hole in the middle of the top half of the cylinder. A hemispherical cap is affixed to the opposing end of the vertical pipe. The cap has a cap hole in its top. A method for installing the natural gas pipe repair fitting by enclosing a leaking natural gas service line "T" fitting with the natural gas pipe repair fitting and welding the natural gas pipe repair fitting to the gas main line is also disclosed.

20 Claims, 2 Drawing Sheets

NATURAL GAS PIPE REPAIR FITTING AND METHOD

BACKGROUND OF THE INVENTION

1. Field of the Invention

The present invention relates to a natural gas pipe repair fitting and method for use in connection with natural gas lines. The natural gas pipe repair fitting and method has particular utility in connection with safely welding a pipe repair fitting over a leaking natural gas service line "T" fitting.

2. Description of the Prior Art

Natural gas pipe repair fittings and methods for using same are desirable for safely welding a pipe repair fitting over a leaking natural gas service line "T" fitting. When a natural gas service line "T" fitting leaks, it must be repaired. In the event it cannot be sealed correctly, a pipe must be welded over it. Unfortunately, the heat and sparks associated with the welding process have the potential to ignite the leaking gas, resulting in an explosion. Natural gas pipe repair fittings and methods for using same allow a welder to safely weld a natural gas pipe repair fitting over the leaking "T" fitting to stop the leak.

The use of pipe repair fittings is known in the prior art. For example, U.S. Pat. No. 3,944,260 to Petroczky discloses pipe repair fittings. However, the Petroczky '260 patent does not have a cap, and has further drawbacks of not being welded to the pipe being repaired.

U.S. Pat. No. 5,022,685 to Stiskin et al. discloses a secondary containment system and method that prevents the escape of materials that may leak from a primary containment system. However, the Stiskin et al. '685 patent does not have a cap, and additionally is not welded to the pipe being repaired.

Similarly, U.S. Pat. No. 4,915,424 to Sarno et al. discloses a branch for other containment shroud that provides a branch for a containment shroud. However, the Sarno et al. '424 patent does not have a cap, and is not welded to the pipe being repaired.

In addition, U.S. Pat. No. 5,368,337 to Torres discloses an adjustable stabilizer clamp that secures a connection between a push-on pipe fitting and a pipe used in fluid lines. However, the Torres '337 patent does not have a cap, and also is not welded to the pipe being repaired.

Furthermore, U.S. Pat. No. Des. 362,916 to Cetrulo discloses a split tee slip-on pipe fitting that is a pipe fitting. However, the Cetrulo '916 patent does not have a cap, and further is not welded to the pipe being repaired.

U.S. Pat. No. 6,217,688 to Landers discloses a method of repairing a flanged pipe joint that repairs a flanged pipe joint. However, the Landers '688 patent does not have a hole in the top of the cap, and has the additional deficiency of not being welded to the pipe being repaired.

Lastly, U.S. Pat. No. 6,305,719 to Smith, Jr. et al. discloses a pipe repair clamp that repairs a damaged pipe member. However, the Smith, Jr. et al. '719 patent does not have a cap, and also is not welded to the pipe being repaired.

While the above-described devices fulfill their respective, particular objectives and requirements, the aforementioned patents do not describe a natural gas pipe repair fitting and method that allows safely welding a pipe repair fitting over a leaking natural gas service line "T" fitting. The above patents make no provision for being welded to the pipe being repaired. With the exception of the Landers '688 patent, the above patents do not have a cap. The Landers '688 patent lacks a hole in the top of the cap.

Therefore, a need exists for a new and improved natural gas pipe repair fitting and method for using same that can be used for safely welding a pipe repair fitting over a leaking natural gas service line "T" fitting. In this regard, the present invention substantially fulfills this need. In this respect, the natural gas pipe repair fitting and method for using same according to the present invention substantially departs from the conventional concepts and designs of the prior art, and in doing so provides an apparatus primarily developed for the purpose of safely welding a pipe repair fitting over a leaking natural gas service line "T" fitting.

SUMMARY OF THE INVENTION

In view of the foregoing disadvantages inherent in the known types of pipe repair fittings now present in the prior art, the present invention provides an improved natural gas pipe repair fitting and method, and overcomes the above-mentioned disadvantages and drawbacks of the prior art. As such, the general purpose of the present invention, which will be described subsequently in greater detail, is to provide a new and improved natural gas pipe repair fitting and method which has all the advantages of the prior art mentioned heretofore and many novel features that result in a natural gas pipe repair fitting and method which is not anticipated, rendered obvious, suggested, or even implied by the prior art, either alone or in any combination thereof. To attain this, the present invention essentially comprises a hollow cylinder having opposing ends and a middle, wherein the cylinder is axially bisected into a top half and a bottom half, a pipe hole defined by a hole in the middle of the top half of the cylinder, a hollow vertical pipe having opposing ends with one end attached to the middle of the top half of the cylinder over the pipe hole, a cap having a top and a bottom with its bottom connected to the opposing end of the vertical pipe, and a cap hole defined by a hole in the cap.

The present invention also includes a method of use comprising the steps of locating a leaking natural gas "T" fitting, obtaining a natural gas pipe repair fitting as defined in claim 13, inserting the leaking natural gas "T" fitting into the vertical pipe through the pipe hole, placing the pipe notches of the top half of the cylinder around the gas main connected to the leaking natural gas "T" fitting, placing the pipe notches of the bottom half of the cylinder around the gas main connected to the leaking natural gas "T" fitting so that the pipe notches are aligned with the pipe notches of the top half of the cylinder, igniting natural gas escaping through the cap hole, welding together the top half of the cylinder and the bottom half of the cylinder, welding the opposing ends of the cylinder to the gas main connected to the leaking natural gas "T" fitting, and welding closed the cap hole in the cap.

There has thus been outlined, rather broadly, the more important features of the invention in order that the detailed description thereof that follows may be better understood and in order that the present contribution to the art may be better appreciated.

The invention may also include the opposing ends of the hollow cylinder being hemispherical. There may be a plurality of pipe notches defined by notches in the opposing ends of the hollow cylinder. The top half of the cylinder, the vertical pipe, and the cap may be joined by welds. The vertical pipe may be about 4 inches long. The cap hole may be about 3/16 of an inch in diameter. The pipe notches may be adapted to fit a 2-inch gas main. The cylinder, the vertical pipe, and the cap may be selected from the group consisting of plastic, steel, aluminum, titanium, and carbon fiber composite. The vertical pipe may be perpendicular to the top half of the cylinder. The vertical pipe may extend perpendicularly from the middle of the top half of the cylinder over the pipe hole. The cap may be hemispherical. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved natural gas pipe repair fitting and method for using same that has all of the advantages of the prior art pipe repair fittings and none of the disadvantages.

It is another object of the present invention to provide a new and improved natural gas pipe repair fitting and method for using same that may be easily and efficiently manufactured and marketed.

An even further object of the present invention is to provide a new and improved natural gas pipe repair fitting and method for using same that has a low cost of manufacture with regard to both materials and labor, and which accordingly is then susceptible of low prices of sale to the consuming public, thereby making such natural gas pipe repair fitting and method for using same economically available to the buying public.

Still another object of the present invention is to provide a new natural gas pipe repair fitting and method for using same that provides in the apparatuses and methods of the prior art some of the advantages thereof, while simultaneously overcoming some of the disadvantages normally associated therewith.

Even still another object of the present invention is to provide a natural gas pipe repair fitting and method for using same for safely welding a pipe repair fitting over a leaking natural gas service line "T" fitting. This allows the leaking natural gas to be contained.

Still yet another object of the present invention is to provide a natural gas pipe repair fitting and method for using same for safely welding a pipe repair fitting over a leaking natural gas service line "T" fitting. This makes it possible to reduce the risk of the leaking natural gas exploding.

An additional object of the present invention is to provide a natural gas pipe repair fitting and method for using same for safely welding a pipe repair fitting over a leaking natural gas service line "T" fitting. This reduces the risk of injury to the welder and bystanders.

A further object of the present invention is to provide a natural gas pipe repair fitting and method for using same for safely welding a pipe repair fitting over a leaking natural gas service line "T" fitting. This reduces the risk of damage to the building served by the leaking natural gas service line "T" fitting.

Lastly, it is an object of the present invention to provide a new and improved natural gas pipe repair fitting and method for using same for safely welding a pipe repair fitting over a leaking natural gas service line "T" fitting.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
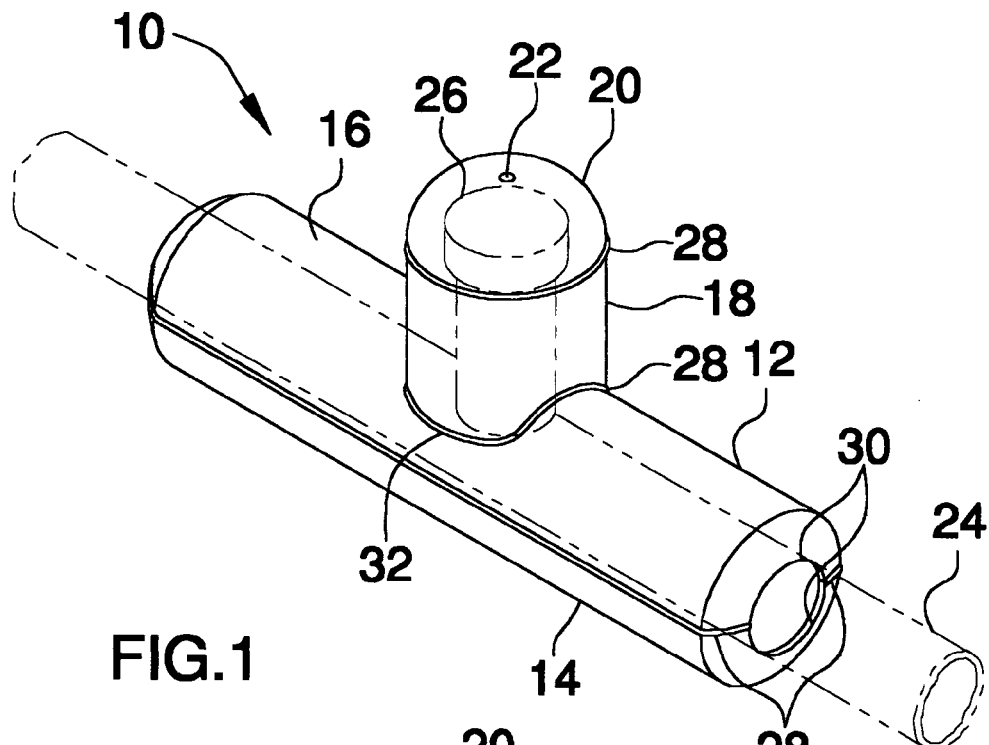
FIG. 1 is a top perspective view of the current embodiment of the natural gas pipe repair fitting constructed in accordance with the principles of the present invention.

Referring now to the drawings, and particularly to FIGS. 1–4, a current embodiment of the natural gas pipe repair fitting of the present invention is shown and generally designated by the reference numeral 10:

In FIG. 1, a new and improved natural gas pipe repair fitting 10 of the present invention for safely welding a pipe repair fitting over a leaking natural gas service line "T" fitting is illustrated and will be described. More particularly, the natural gas pipe repair fitting 10 has a bottom half 14 and a top half 16 which are welded together to form a cylinder 12. A vertical pipe 18 has one end attached to the middle of the top half 16 over a pipe hole 32 in the middle of the top half 16 of the cylinder 12. The opposing end of the vertical pipe 18 is attached to the bottom of a cap 20. The cap 20 has a cap hole 22 in its top. The natural gas pipe repair fitting 10 is depicted in a partially installed state with the gas main 24 fitted into the pipe notches 30 in the opposing ends of the cylinder 12 and the "T" fitting 26 having been inserted into the vertical pipe 18 and cap 20 through the pipe hole 32. The cap 20, vertical pipe 18, and top half 16 of the cylinder 12 are joined by welds 28 prior to installation over the "T" fitting 26. The user (not shown) then uses additional welds 28 to join the top half 16 to the bottom half 14 of the cylinder 12 after igniting the leaking natural gas (not shown) escaping through the cap hole 22. In the current embodiment, the cap 20, vertical pipe 18, top half 16, and bottom half 14 are made of steel, the opposing ends of the cylinder 12 are hemispherical, the pipe notches 30 are semicircular and are adapted to fit a 2-inch gas main 24, the vertical pipe 18 is about 4 inches long, and the cap hole 22 is about 3/16 of an inch in diameter. Note that the broken lines illustrating the gas main 24 and "T" fitting 26 are for illustrative purposes only and are not part of the current invention.

Figure 2:
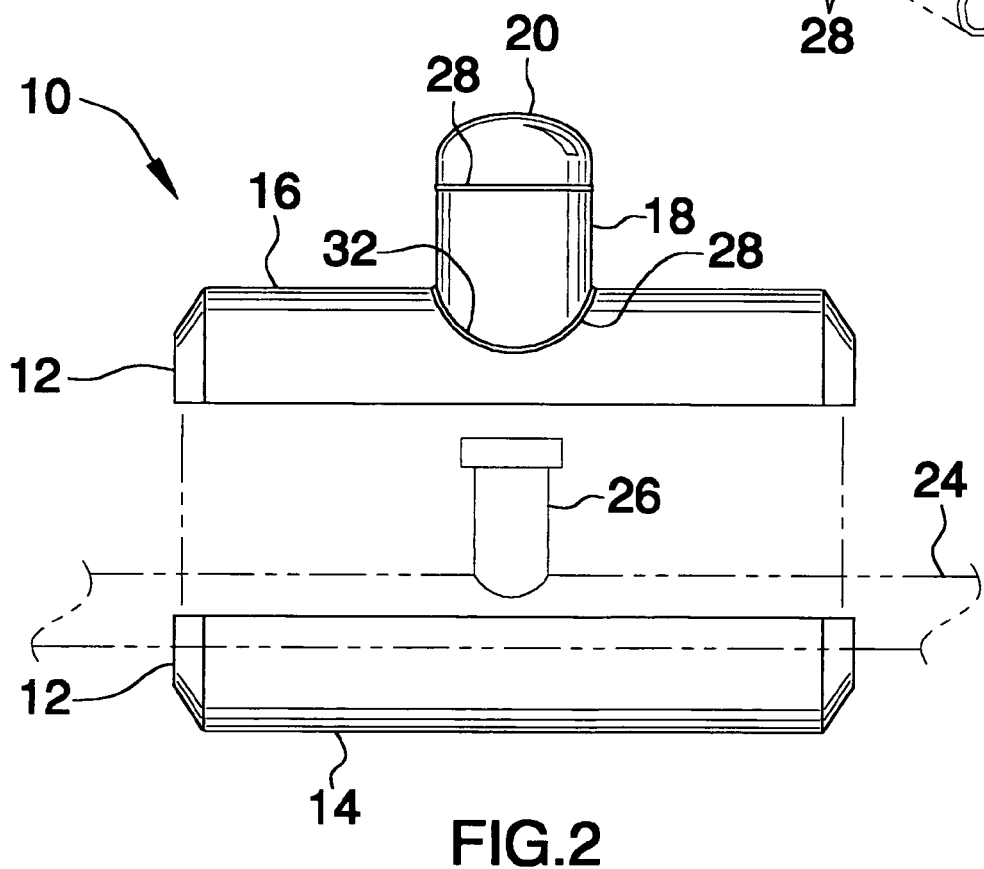
FIG. 2 is a side exploded view of the natural gas pipe repair fitting of the present invention.

Moving on to FIG. 2, a new and improved natural gas pipe repair fitting 10 of the present invention for safely welding a pipe repair fitting over a leaking natural gas service line "T" fitting is illustrated and will be described. More particularly, the natural gas pipe repair fitting 10 has a bottom half 14 and a top half 16 which are welded together during installation to form a cylinder 12. A vertical pipe 18 has one end attached to the middle of the top half 16 over a pipe hole 32 in the middle of the top half 16 of the cylinder 12. The opposing end of the vertical pipe 18 is attached to the bottom of a cap 20. The cap 20 has a cap hole 22 in its top. The natural gas pipe repair fitting 10 is depicted in a partially installed state with the gas main 24 fitted into the pipe notches 30 in the opposing ends of the bottom half 14 and the "T" fitting 26 about to be inserted into the vertical pipe 18 and cap 20 through the pipe hole 32. The cap 20, vertical pipe 18, and top half 16 of the cylinder 12 are joined by welds 28 prior to installation over the "T" fitting 26. In the current embodiment, the cap 20, vertical pipe 18, top half 16, and bottom half 14 are made of steel, the opposing ends of the cylinder 12 are hemispherical, the pipe notches 30 are semicircular and are adapted to fit a 2-inch gas main 24, the vertical pipe 18 is about 4 inches long, and the cap hole 22 is about 3/16 of an inch in diameter. Note that the broken lines illustrating the gas main 24 and "T" fitting 26 are for illustrative purposes only and are not part of the current invention.

Figure 3:
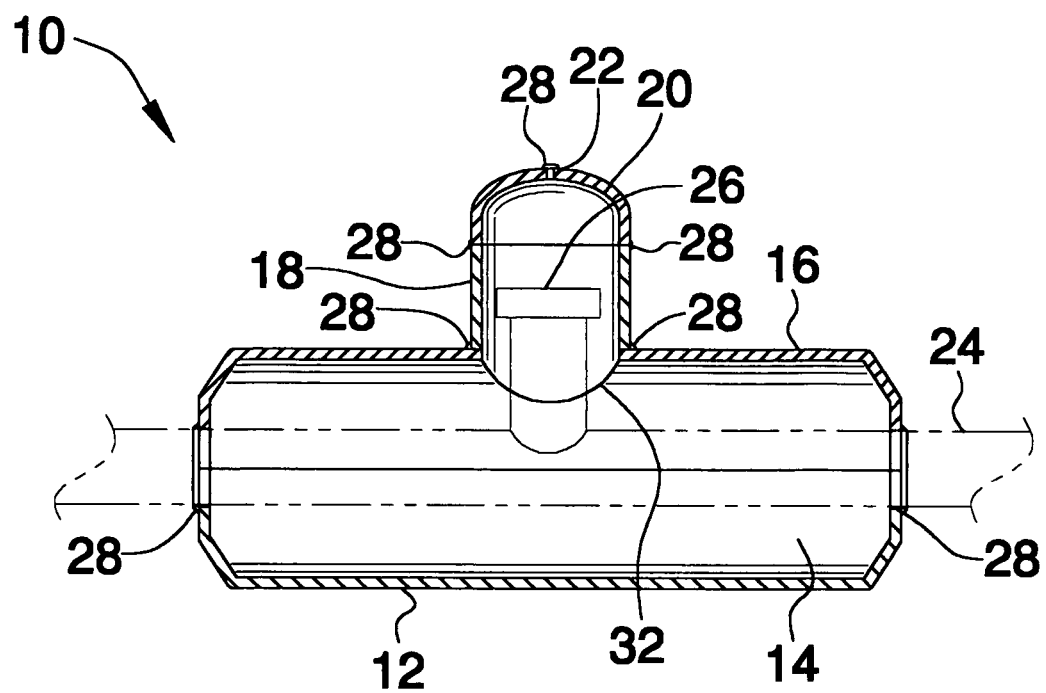
FIG. 3 is a side sectional view of the natural gas pipe repair fitting of the present invention.

Continuing with FIG. 3, a new and improved natural gas pipe repair fitting 10 of the present invention for safely welding a pipe repair fitting over a leaking natural gas service line "T" fitting is illustrated and will be described. More particularly, the natural gas pipe repair fitting 10 has a bottom half 14 and a top half 16 which are welded together to form a cylinder 12. A vertical pipe 18 has one end attached to the middle of the top half 16 over a pipe hole 32 in the middle of the top half 16 of the cylinder 12. The opposing end of the vertical pipe 18 is attached to the bottom of a cap 20. The cap 20 has a cap hole 22 in its top. The natural gas pipe repair fitting 10 is depicted in a fully installed state with the gas main 24 having been fitted into the pipe notches 30 in the opposing ends of the cylinder 12, the "T" fitting 26 having been inserted into the vertical pipe 18 and cap 20 through the pipe hole 32, the opposing ends of the cylinder 12 having been joined by welds 28 to the gas main 24, and a weld 28 having closed off the cap hole 22. The cap 20, vertical pipe 18, and top half 16 of the cylinder 12 are joined by welds 28 prior to installation over the "T" fitting 26. The user then uses additional welds 28 to join the top half 16 to the bottom half 14 of the cylinder 12 after igniting the leaking natural gas (not shown) escaping through the cap hole 22, and then adds the additional welds 28 noted above, finishing with the weld 28 over the cap hole 22. In the current embodiment, the cap 20, vertical pipe 18, top half 16, and bottom half 14 are made of steel, the opposing ends of the cylinder 12 are hemispherical, the pipe notches 30 are semicircular and are adapted to fit a 2-inch gas main 24, the vertical pipe 18 is about 4 inches long, and the cap hole 22 is about 3/16 of an inch in diameter. Note that the broken lines illustrating the gas main 24 and "T" fitting 26 are for illustrative purposes only and are not part of the current invention.

Figure 4:
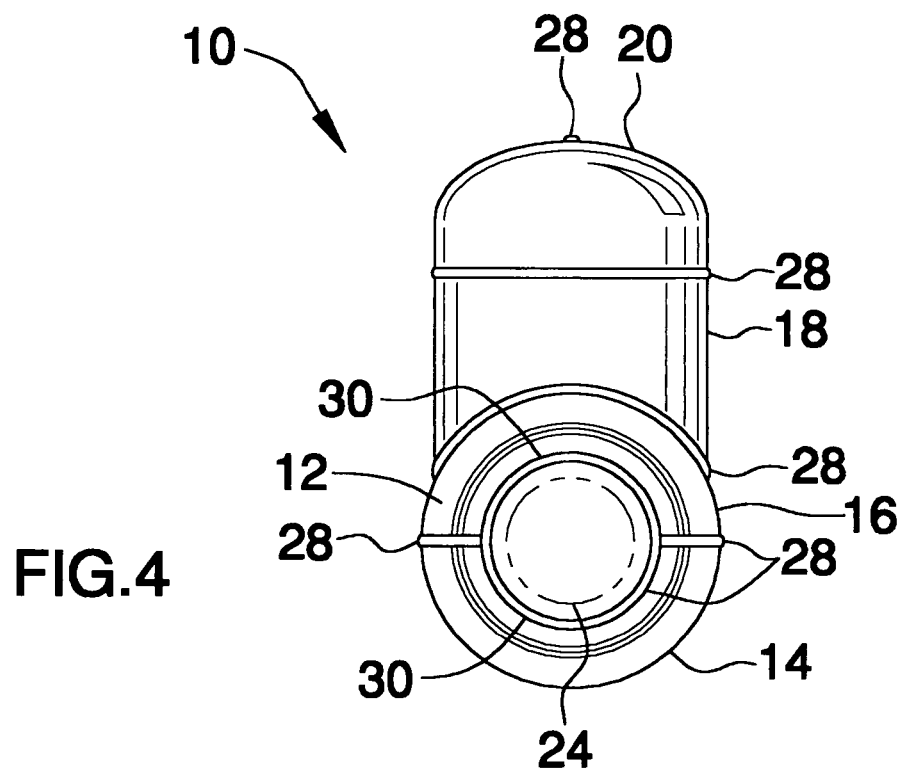
FIG. 4 is a front side view of the natural gas pipe repair fitting of the present invention.

Concluding with FIG. 4, a new and improved natural gas pipe repair fitting 10 of the present invention for safely welding a pipe repair fitting over a leaking natural gas service line "T" fitting is illustrated and will be described. More particularly, the natural gas pipe repair fitting 10 has a bottom half 14 and a top half 16 which are welded together to form a cylinder 12. A vertical pipe 18 has one end attached to the middle of the top half 16 over a pipe hole 32 in the middle of the top half 16 of the cylinder 12. The opposing end of the vertical pipe 18 is attached to the bottom of a cap 20. The cap 20 has a cap hole 22 in its top. The natural gas pipe repair fitting 10 is depicted in a fully installed state with the gas main 24 having been fitted into the pipe notches 30 in the opposing ends of the cylinder 12, the "T" fitting 26 having been inserted into the vertical pipe 18 and cap 20 through the pipe hole 32, the opposing ends of the cylinder 12 having been joined by welds 28 to the gas main 24, and a weld 28 having closed off the cap hole 22. The cap 20, vertical pipe 18, and top half 16 of the cylinder 12 are joined by welds 28 prior to installation over the "T" fitting 26. The user then uses additional welds 28 to join the top half 16 to the bottom half 14 of the cylinder 12 after igniting the leaking natural gas (not shown) escaping through the cap hole 22, and then adds the additional welds 28 noted above, finishing with the weld 28 over the cap hole 22. In the current embodiment, the cap 20, vertical pipe 18, top half 16, and bottom half 14 are made of steel, the opposing ends of the cylinder 12 are hemispherical, the pipe notches 30 are semicircular and are adapted to fit a 2-inch gas main 24, the vertical pipe 18 is about 4 inches long, and the cap hole 22 is about 3/16 of an inch in diameter. The opposing ends of the cylinder 12 are welded 360° around the gas main 24 in the current embodiment. Note that the broken lines illustrating the gas main 24 and "T" fitting 26 are for illustrative purposes only and are not part of the current invention.

In use, it can now be understood that the user installs the natural gas pipe repair fitting 10 by following the steps of locating a leaking natural gas "T" fitting, obtaining a natural gas pipe repair fitting 10, inserting the leaking natural gas "T" fitting into the vertical pipe through the pipe hole, placing the pipe notches of the top half of the cylinder around the gas main connected to the leaking natural gas "T" fitting, placing the pipe notches of the bottom half of the cylinder around the gas main connected to the leaking natural gas "T" fitting so that the pipe notches are aligned with the pipe notches of the top half of the cylinder, igniting natural gas escaping through the cap hole, welding together the top half of the cylinder and the bottom half of the cylinder, welding the opposing ends of the cylinder to the gas main connected to the leaking natural gas "T" fitting, and welding closed the cap hole in the cap.

While a current embodiment of the natural gas pipe repair fitting and method for using same has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, aluminum, titanium, or carbon fiber composite may be used instead of the steel cap, vertical tube, and cylinder described. Also, the 4 inch long vertical pipe may also be made in other lengths. And although safely welding a pipe repair fitting over a leaking natural gas service line "T" fitting has been described, it should be appreciated that the natural gas pipe repair fitting and method for using same herein described is also suitable for repairing leaks in other types of pipes. Furthermore, a wide variety of cap hole sizes may be used instead of the 3/16 of an inch described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A natural gas pipe repair fitting comprising:
   a hollow cylinder having opposing ends and a middle, wherein said cylinder is axially bisected into a top half and a bottom half;
   a pipe hole, wherein said middle of said top half of said cylinder defines a hole therein to comprise said pipe hole;
   a hollow vertical pipe having opposing ends with one end attached to said middle of said top half of said cylinder over said pipe hole;
   a cap having a top and a bottom with said bottom connected to said opposing end of said vertical pipe; and
   a cap hole, wherein said top of said cap defines a hole therein to comprise said cap hole.

2. The natural gas pipe repair fitting as defined in claim 1, wherein said opposing ends of said hollow cylinder are hemispherical.

3. The natural gas pipe repair fitting as defined in claim 1, further comprising a plurality of pipe notches wherein said opposing ends of said hollow cylinder define notches therein to comprise said pipe notches.

4. The natural gas pipe repair fitting as defined in claim 1, wherein said top half of said cylinder, said vertical pipe, and said cap are joined by welds.

5. The natural gas pipe repair fitting as defined in claim 1, wherein said vertical pipe is about 4 inches long.

6. The natural gas pipe repair fitting as defined in claim 1, wherein said cap hole is about 3/16 of an inch in diameter.

7. The natural gas pipe repair fitting as defined in claim 3, wherein said pipe notches are adapted to fit a 2-inch gas main.

8. The natural gas pipe repair fitting as defined in claim 1, wherein said cylinder, said vertical pipe, and said cap are selected from the group consisting of plastic, steel, aluminum, titanium, and carbon fiber composite.

9. The natural gas pipe repair fitting as defined in claim 1, wherein said vertical pipe is perpendicular to said top half of said cylinder.

10. A natural gas pipe repair fitting comprising:
    a cap having a top and a bottom;
    a hollow vertical pipe having opposing ends with one end attached to said bottom of said cap;
    a hollow cylinder having opposing ends and a middle, wherein said cylinder is axially bisected into a top half and a bottom half and said middle of said top half is attached to said opposing end of said vertical pipe;
    a pipe hole, wherein said middle of said top half of said cylinder defines a hole therein to comprise said pipe hole; and
    a cap hole, wherein said top of said cap defines a hole therein to comprise said cap hole.

11. The natural gas pipe repair fitting as defined in claim 10, wherein said vertical pipe extends perpendicularly from said middle of said top half of said cylinder over said pipe hole.

12. The natural gas pipe repair fitting as defined in claim 11, wherein said opposing ends of said hollow cylinder are hemispherical.

13. The natural gas pipe repair fitting as defined in claim 12, further comprising a plurality of pipe notches, wherein said opposing ends of said hollow cylinder define notches therein to comprise said pipe notches.

14. The natural gas pipe repair fitting as defined in claim 13, wherein said top half of said cylinder, said vertical pipe, and said cap are joined by welds.

15. The natural gas pipe repair fitting as defined in claim 10, wherein said vertical pipe is about 4 inches long.

16. The natural gas pipe repair fitting as defined in claim 10, wherein said cap hole is about 3/16 of an inch in diameter.

17. The natural gas pipe repair fitting as defined in claim 10, wherein said pipe notches are adapted to fit a 2-inch gas main.

18. The natural gas pipe repair fitting as defined in claim 10, wherein said cylinder, said vertical pipe, and said cap are selected from the group consisting of plastic, steel, aluminum, titanium, and carbon fiber composite.

19. The natural gas pipe repair fitting as defined in claim 10, wherein said cap is hemispherical.

20. A method for repairing a leaking natural gas "T" fitting comprising the steps of:
    locating a leaking natural gas "T" fitting;
    obtaining a natural gas pipe repair fitting, wherein said natural gas pipe repair fitting comprises:
    a cap having a top and a bottom;
    a hollow vertical pipe having opposing ends with one end attached to said bottom of said cap;
    a hollow cylinder having opposing ends and a middle, wherein said cylinder is axially bisected into a top half and a bottom half, said middle of said top half is attached to said opposing end of said vertical pipe, and said opposing ends of said hollow cylinder are hemispherical;
    a pipe hole, wherein said middle of said top half of said cylinder defines a hole therein to comprise said pipe hole, wherein said vertical pipe extends perpendicularly from said middle of said top half of said cylinder over said pipe hole;
    a cap hole, wherein said top of said cap defines a hole therein to comprise said cap hole, and
    a plurality of pipe notches, wherein said opposing ends of said hollow cylinder define notches therein to comprise said pipe notches;
    inserting said leaking natural gas "T" fitting into said vertical pipe through said pipe hole;
    placing said pipe notches of said top half of said cylinder around the gas main connected to said leaking natural gas "T" fitting;
    placing said pipe notches of said bottom half of said cylinder around the gas main connected to said leaking natural gas "T" fitting so that said pipe notches are aligned with said pipe notches of said top half of said cylinder;

igniting natural gas escaping through said cap hole;

welding together said top half of said cylinder and said bottom half of said cylinder;

welding said opposing ends of said cylinder to said gas main connected to said leaking natural gas "T" fitting; and welding closed said cap hole in said cap.

* * * * *